United States Patent
Hulick, Jr.

(10) Patent No.: US 10,984,109 B2
(45) Date of Patent: Apr. 20, 2021

(54) APPLICATION COMPONENT AUDITOR

(71) Applicant: Cisco Technology, Inc., San Jose, CA (US)

(72) Inventor: Walter Theodore Hulick, Jr., Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 419 days.

(21) Appl. No.: 15/883,492

(22) Filed: Jan. 30, 2018

(65) Prior Publication Data
US 2019/0236282 A1    Aug. 1, 2019

(51) Int. Cl.
| H04L 29/06 | (2006.01) |
| G06F 21/00 | (2013.01) |
| G06F 21/57 | (2013.01) |
| G06F 16/951 | (2019.01) |

(52) U.S. Cl.
CPC .......... G06F 21/577 (2013.01); G06F 16/951 (2019.01); *G06F 2221/033* (2013.01)

(58) Field of Classification Search
CPC . G06F 21/577; G06F 16/951; G06F 2221/033
See application file for complete search history.

(56) References Cited

U.S. PATENT DOCUMENTS

| 9,569,201 | B1* | 2/2017 | Lotem | H04L 63/1433 |
| 9,749,349 | B1* | 8/2017 | Czarny | H04L 63/1433 |
| 2003/0182310 | A1* | 9/2003 | Charnock | G06Q 10/10 |
| 2006/0106585 | A1* | 5/2006 | Brown | G06F 8/20 |
| | | | | 703/1 |
| 2006/0136737 | A1* | 6/2006 | Bauchot | G06F 21/31 |
| | | | | 713/183 |
| 2009/0193859 | A1* | 8/2009 | Kwon | E05B 47/026 |
| | | | | 70/91 |
| 2010/0235918 | A1* | 9/2010 | Mizrahi | H04L 63/1416 |
| | | | | 726/25 |
| 2014/0109230 | A1* | 4/2014 | Oliphant | H04L 63/1416 |
| | | | | 726/25 |
| 2015/0205942 | A1* | 7/2015 | Yang | H04L 63/083 |
| | | | | 726/19 |
| 2017/0171236 | A1* | 6/2017 | Ouchn | H04L 63/1433 |
| 2018/0089188 | A1* | 3/2018 | Kharisma | G06F 16/2255 |
| 2018/0176245 | A1* | 6/2018 | Cornell | G06F 21/577 |
| 2019/0095478 | A1* | 3/2019 | Tankersley | G06F 16/2365 |
| 2019/0147167 | A1* | 5/2019 | Kim | G06F 8/427 |
| | | | | 726/25 |
| 2019/0156042 | A1* | 5/2019 | Kim | G06F 16/93 |

\* cited by examiner

*Primary Examiner* — Lisa C Lewis
(74) *Attorney, Agent, or Firm* — Behmke Innovation Group LLC; James M. Behmke; Jonathon P. Western

(57) ABSTRACT

In one embodiment, a process on a computer for dynamic application component auditing is disclosed, the process includes automatically identifying, by an agent, all application components in an application. The process includes determining, by the agent, manifest information for the identified application components. The process includes accessing, by the agent, an alias file to convert the determined manifest information to align with corresponding information in a vulnerability database. The process includes using a Web service to query the vulnerability database to search for a match with the converted manifest information. The process includes responsive to the query, creating an audit report of the application components.

17 Claims, 4 Drawing Sheets

US 10,984,109 B2

APPLICATION COMPONENT AUDITOR

TECHNICAL FIELD

The present disclosure relates generally to computer applications, and, more particularly, to auditing dependencies or components (e.g., .jars and packages) of an application to perform security risk assessment of each application component.

BACKGROUND

It is not uncommon for computer applications to include third party libraries (i.e., components) that contain well known published vulnerabilities, such as those identified by the National Vulnerability Database (NVD) using Common Vulnerabilities and Exposures (CVE), and Common Platform Enumeration (CPE). The CPE represents a structured naming scheme for information technology systems, software, and packages.

Component vulnerabilities existing in the computer applications can be exploited by hackers to cause various harms, some of which may be trivial but can also include sophisticated malware designed to target a specific organization. Because components tend to run with the full privilege of the application, flaws exposed by the vulnerabilities in the components can have serious consequences. While resources such as the NVD exists to provide a robust list of known component vulnerabilities, the ability to accurately audit the components of an application to find correct matches against these known component vulnerabilities has been elusive, and non-existent in a production environment due to performance and resource constraints.

BRIEF SUMMARY

Examples of implementations of dynamic application component auditing for vulnerabilities are disclosed. Specifically, the ability to dynamically audit application components for vulnerabilities after product release enables continuous identification of vulnerabilities rather than a static pre-production scan. Moreover, the ability to dynamically audit the application components enables automatic execution of preventative actions to address the risks associated with the detected vulnerabilities. This dynamic auditing capability is important to identifying vulnerabilities that were not yet discovered during the product development cycle to be identified during runtime after the release.

In one aspect, a method for dynamic application component auditing includes automatically identifying, by an agent, all application components in an application. The method includes determining, by the agent, manifest information for the identified application components. The method includes accessing, by the agent, an alias file to convert the determined manifest information to align with corresponding information in a vulnerability database. The method includes using a Web service to query the vulnerability database to search for a match with the converted manifest information. The method includes responsive to the query, creating an audit report of the application components.

The method can be implemented in various ways to include one or more of the following features. For example, when a match is found between the converted manifest information and the information in the vulnerability database, a web-link can be created in the audit report pointing to an entry in the vulnerability database that describes the matched vulnerability. The method can include creating a summary of the match. The method can include generating an alert responsive to the match. The manifest information can include vendor, product, and version information in the manifest of the identified application components. The alias file can be used to convert the manifest information that aligns with the vulnerability database information that includes vendor, product, and version names in a National Vulnerability Database (NVD). The method can include initiating a periodic repeat of the dynamic application component auditing to search for new vulnerabilities. Based on each subsequent check, additional notifications can be generated when new vulnerabilities are matched. The additional notifications can include vulnerability health alerts. The method can include generating a vulnerability score based on the periodic dynamic audits performed. The method can include generating a recommendation of a preventative action. The method can include automatically initiating a preventative action.

In another aspect, a system for dynamic application component auditing can be implemented, where the system includes a processor, memory, and one or more modules stored in the memory and executable by the processor to perform the disclosed methods.

In yet another aspect, a tangible, non-transitory, computer-readable medium storing program instructions that cause a computer to execute the disclosed method can be implemented.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
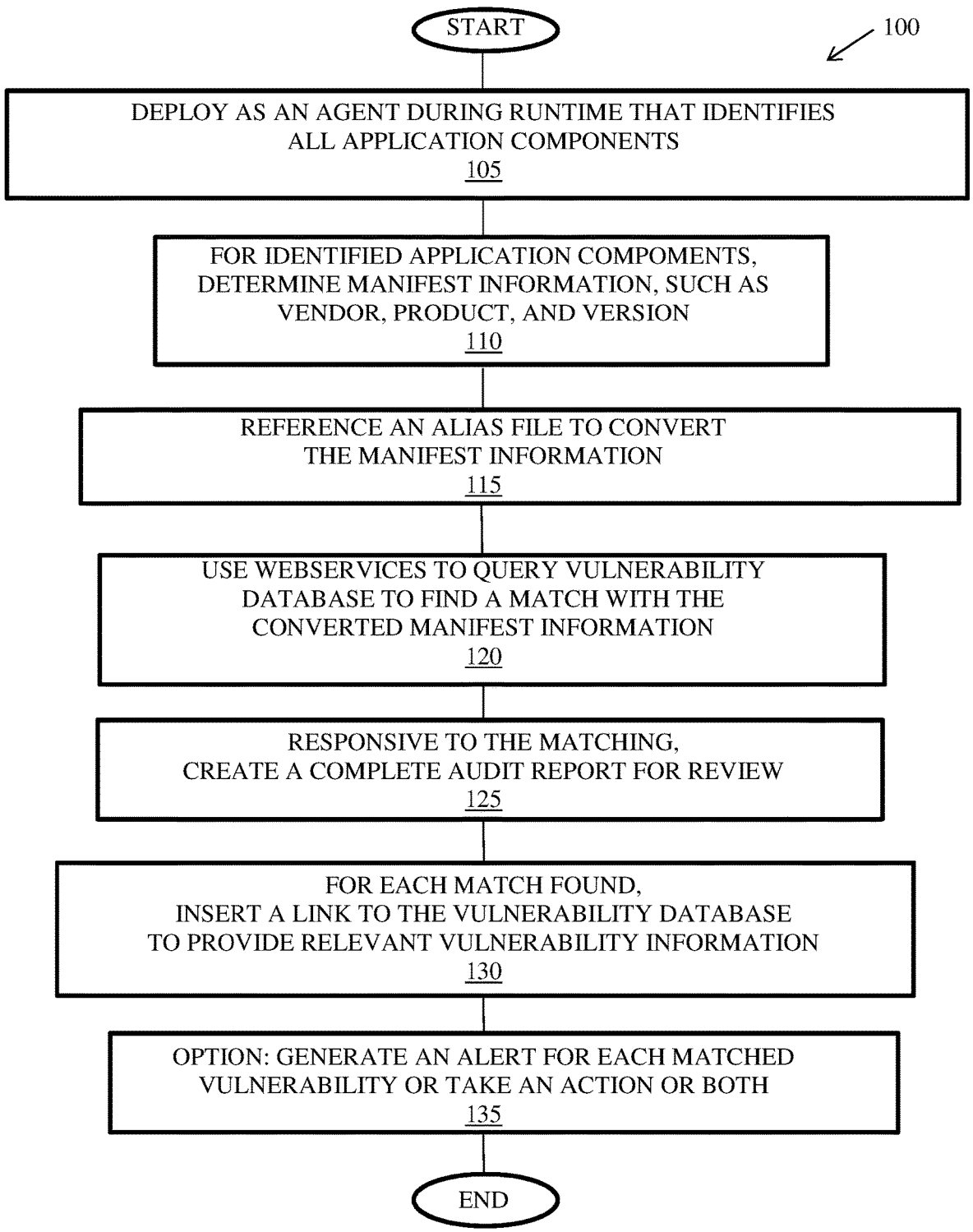
FIG. 1 is a process flow diagram of an exemplary process for performing the disclosed techniques for application component audit.

According to one or more embodiments of the disclosure, techniques herein provide for dynamic auditing of all dependencies or components (e.g., .jars and packages) of an application by accurately finding matches against a vulnerability assessment database to properly assess the security risk of each application component. The ability to accurately find matches can improve identification of certain components at high risk that require an upgrade or a replacement to remediate the risk.

The disclosed techniques can provide a number of technical advantages to the problem of component vulnerability risk assessment and remediation. For example, the disclosed techniques are runtime-based auditing, which is advantageous over static scanning. Runtime based auditing is more accurate than static scanning modules on disk and by using a special alias file to map the components to the vulnerability database, such as the NVD—the mapping mechanism is more accurate. This mapping is performed continuously over a desired period of time, such as seconds, minutes, hours, days, weeks, etc. By performing such continuous runtime based auditing, vulnerability risks can be identified even after a release in a timely manner before being exploited. Thus, the disclosed techniques are geared for production rather than just during staging.

DESCRIPTION

—Matching Components with Vulnerability Database—

One important aspect of the disclosed techniques for performing runtime based audits of component vulnerabilities is the ability to accurately match the .jar manifest information, which provides a list of the components, with the vulnerability record, such as the NVD. Often times, the manifest information on the jar side are not consistent with the information found on the vulnerability record or database due to inconsistent naming conventions.

On the manifest side, a GAV (Group Artifact Version), which essentially is the fingerprint found in the manifest, is generally used to identify the components in an application. While a naming schema for the groupId, artifactId, and the version is generally agreed upon and understood, inconsistent compliance leads to unrecognizable identifications which allow vulnerabilities to go undetected.

Because a groupId in the GAV is used to identify a project (i.e., for a vendor) uniquely across all projects, a naming schema should be enforced and followed. The naming schema should follow the package name rules, which means the name should include at least a domain name controlled by the owner of the project. One can create as many subgroups as desired. Examples include: org.apache.maven and org.apache.commons.

The granularity of the groupId can be determined by using the project structure. For example, if the current project is a multiple module project, a new identifier should be appended to the parent's groupId. Examples includes: org.apache.maven, org.apache.maven.plugins, and org.apache.maven.reporting.

The artifactId in the GAV represents the name without version. The creator of the artifact can choose any name desired but must use lowercase letters only with no strange symbols. The artifactId name of a third party component must be retained as distributed by the third party. Examples include: maven, commons-math.

The version in the GAV represents the version number of the jar artifact. Typically, the version includes numbers and dots (e.g., 1.0, 1.1, 1.0.1, 2.0, 2.0.1, 1.3.1 . . . ). Dates should be avoided in the version because dates are usually associated with the snapshot builds. However, the version in a third party artifact must be retained as distributed.

On the vulnerability record or database side, such as the NVD, a list of known vulnerabilities exists using the CPE that can be matched with the manifest information in the GAV on the jar side. The CPE is a structured naming schema that describes the software product.

—Configuration Files to Bridge the GAV and NVD's CPE—

An application auditor can use a web service to perform a query for vendor, product, and any vulnerabilities matched with the NVD. A number of application program interfaces (APIs) can be used by the web service to search the NVD for vulnerability matches. However, matching the vendor/product/version between the manifest information in the jar against the NVD database is very challenging due to inconsistencies in the naming schema used in the NVD and the GAV. The disclosed techniques use configuration files as an alias to bridge the differences between the GAV and NVD.

The first configuration file (e.g., "convertVendors.properties") is a vendor configuration file used to map the vendor names in the manifest of the GAV to the vendor names expected in the NVD's CPE. The vendor configuration file is used to create an alias mapping to identify all vendors in the NVD. The following are examples where GAV vendor name=NVD vendor name:

```
FasterXML=fasterxml
Oracle Corporation=oracle
Oracle=oracle
The Apache Software Foundation=apache
Apache Software Foundation=apache
Adobe Systems Inc.=adobe
Google=google
Google, Inc.=google
Google Gson Project=google
Eclipse.org=eclipse
Eclipse.org - Jetty=eclipse
The Open Web Application Security Project (OWASP)=owasp
```

The second configuration file is a product configuration file (e.g., "convertProducts.properties"), which maps the product names or the jar in the jar manifest in the GAV to the product names expected in the NVD's CPE. The product configuration file is used to create an alias mapping to identify all products for a vendor in the NVD. The following are examples where GAV product name=NVD product name or jar name prefix (truncating the version)=NVD product name:

```
Jackson-core=Jackson
Jackson-annotations=Jackson
jackson-databind=Jackson
Jackson module=Jackson
Jackson datatype=Jackson
Java Runtime Environment=jre
Java Development Kit=jdk
Jackson-dataformat-YAML=Jackson
Jackson-datatype-Joda=Jackson
ESAPI=esapi
javax.xml.xpath=xerces-c%2b%2b
org.apache.xerces.xni=xerces-c%2b%2b
HttpComponents Apache HttpCore NIO=httpclient
HttpComponents Apache HttpCore=httpclient
MySQL Connector Java=mysql_connector_j
Apache Commons Collections=commons_collections
Apache Commons BeanUtils=commons_beanutils
HttpComponents Apache HttpClient=httpclient
HttpComponents Apache HttpAsyncClient=httpasyncclient
HttpComponents Apache HttpCore=httpclient
Apache Tomcat=tomcat
Apache Commons FileUpload=commons_fileupload
org.apache.regexp=xalan-java
derby.jar=derby
felix.jar=felix
guice.jar=guice
derbyclient.jar=derby
guice-assistedinject.jar=guice
gson.jar=gson
protobuf-java.jar=protobuf
jetty-util.jar=jetty
guice-multibindings.jar=guice
tomcat-jdbc.jar=tomcat
guice-servlet.jar=guice
guice-throwingproviders.jar=guice
```

—Using a Management System (Such as Java Management Extensions (JMX)) to View Application Components—

JMX is a popular management framework on the Java platform and can display metrics or data using a JMX console or client, such as JConsole. JConsole is a JMX console or client widely distributed with Java. JMX console or client can be used to browse JMX metrics and execute operations. The disclosed techniques use a JMX console or client, such as JConsole to view the Handler object that reviews each of the discovered components or jars. The JConsole can be used to drill into a discovered component to determine attributes related to that component.

In some implementations, the JConsole can be used to update the discovered component list. A JMX operation can be performed to launch an update of the component list.

In some implementations, the JConsole can be used to generate a report of the discovered component lists. A JMX operation can be performed to generate a report and display the generated report.

—Exemplary Technical Solutions to Address Technical Problems—

The disclosed techniques address critical security issues inherent in Java based software applications caused by component vulnerabilities. Majority (some have reported up to 97%) of all Java applications have at least one vulnerability. According to some reports, over fifteen thousand vulnerabilities (approximately 41 a day) were reported in 2016 with approximately 20% found to be critical vulnerabilities. Applications that are only statically tested and scanned before being released are never audited again for vulnerabilities that are later discovered. Because most vulnerabilities are discovered in applications after release, static scanning for vulnerabilities is insufficient to identify and eliminate the risks associated with such vulnerabilities.

Even when the vulnerabilities are identified, one of the difficult tasks is identifying all of the servers that need to be patched to address the identified vulnerabilities. Failure to correctly identify and patch all affected servers will be ineffective in addressing the risk associated with the identified vulnerabilities.

The process of comparing application components in the jar manifest information of GAV with the NVD's CPE to identify matching component vulnerabilities is a challenge for a number of reasons. For example, the process is CPU intensive and technically difficult due to the different terminology (e.g., vendor, product, version) syntax used in the GAV and the NVD's CPE.

The disclosed techniques address the above identified technical problems by providing various technical solutions. The disclosed techniques can be used to check the NVD's CPE periodically, such as at regular intervals (e.g., daily, weekly, etc.) The disclosed techniques provide more than just scanning the application for vulnerabilities. The disclosed techniques can be implemented as an agent that is deployed and stays with the application to perform dynamic audits for vulnerabilities. Using the agent implementation, various preventive actions can be performed or recommended. For example, notifications can be provided and applications can be shutdown to alert information technology (IT) personnel as to the existence of the vulnerabilities and the identification of systems that are infected by the vulnerabilities. In one aspect, optimized web services are used to check a vulnerability database (e.g., NVD) rather than downloading the entire vulnerability database from the NVD to enable around the clock operation in production without affecting the application. An alias file is used to map the information in the Manifest (e.g., Maven GAV) to the vulnerability database information (e.g., NVD CPE record entry).

FIG. 1 is a process flow diagram of an exemplary process 100 for performing the disclosed techniques for application component audit. The disclosed techniques can be implemented to load at runtime as an agent that automatically identifies all application components (e.g., .jar, .war, etc.) (105). For the identified application components, the manifest information is determined, such as vendor, product, and version information using the Maven GAV or other attributes in the manifest (110). An alias file is referenced to convert the manifest information (e.g., Vendor, Product, Version) determined from the manifest to align with the correct vulnerability database information, such as the Vendor, Product, Version names in the NVD database (115). Web services are used to query the vulnerability database, such as the NVD to find a match with the converted manifest information (120). Responsive to the matching performed, a complete audit report of all components is created for review (125). In the audit report, if a vulnerability match is found, a web-link with a summary is created for the vulnerability to allow a user to click on the web-link to access the vulnerability entry information (e.g., the NVD CVE entry) (130). In addition, an alert can be generated (135) to notify application stakeholders of the vulnerability and the location of the machine that needs to be dispatched.

Figure 2:
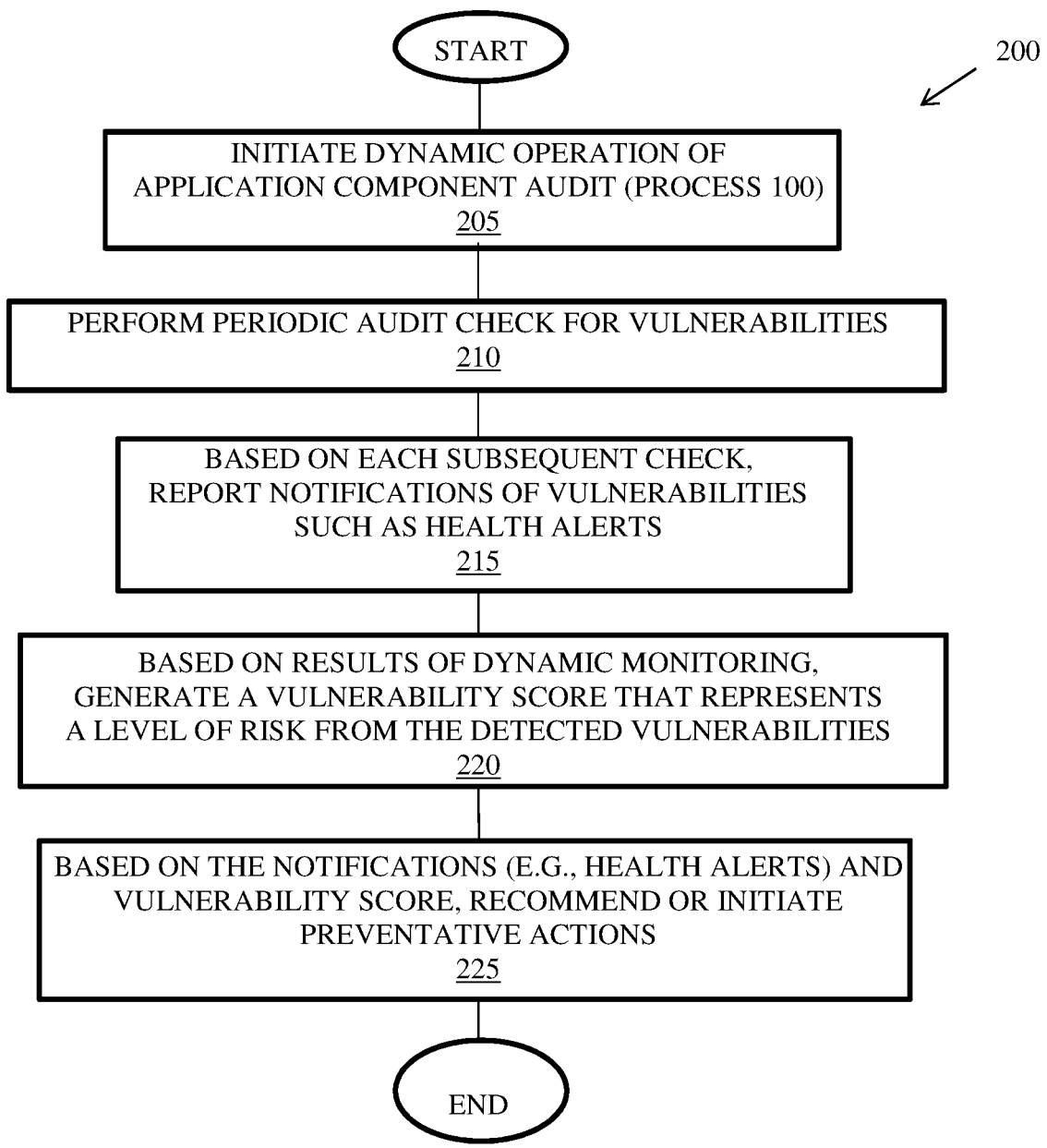
FIG. 2 is a process flow diagram of another exemplary process for performing the application component audit as disclosed herein.

FIG. 2 is a process flow diagram of another exemplary process 200 for performing the application component audit as disclosed herein. When the disclosed techniques are configured for production, the process 200 can include initiating the application component audit process 100 in a dynamic mode of operation (205). For example, the application components can be checked periodically (e.g., hours, days, weeks, etc.) to dynamically and continuously check for new vulnerabilities (210). Based on each subsequent check, notifications, such as vulnerability health alerts can be reported (215). Such ongoing dynamic auditing of components allows for continuous monitoring to determine whether components are reported as being vulnerable and a vulnerability score can be assessed based on the dynamic audits performed (220).

Based on the health alerts and the vulnerability scores (e.g., if a predetermined threshold is met), various preventive actions can be either recommended or performed automatically (225). For example, a scheduled or automatic shutdown of the infected application or system can be performed or recommended when the vulnerability score exceeds meets or exceeds a threshold.

The disclosed techniques can provide a number of technical advantages. For example, the disclosed techniques can be used to perform dynamic vulnerability audits to report versions, licenses, and other information on third party created components used in the audited application. Knowledge of such information is critical for application security, legal, and application stakeholders to identify and eliminate risk and actual harm.

The disclosed techniques allow for continuous audits against the vulnerability database (e.g., the NVD) for detecting vulnerabilities in an automated fashion in production. This allows for identification of vulnerabilities even after being placed in production with the ability to send alert and initiate a preventative action in response.

The disclosed techniques allow for quick detection of vulnerabilities, which can be addressed via patches.

—Exemplary Technical Applications of the Disclosed Techniques—

The disclose techniques can be implemented as agents in various technical applications where the ability to perform dynamic and continuous vulnerability audits of application components is beneficial. For example, the disclosed techniques can be used in DevOps and SecOps tools that can be used in product staging to find vulnerabilities.

In some implementations, the disclosed techniques can be implemented as an audit tool to expose all third party components used in an application as part of a Java Agent component audit. Among other things, the Application Performance Management Platform can be used to monitor performance within a networking environment, specifically by monitoring applications and entities (e.g., transactions, tiers, nodes, and machines) in the networking environment using agents installed at individual machines at the entities.

In some implementations, the disclosed techniques implemented as an agent in the Application Performance Management platform that reports to network security product offerings to provide end-to-end network security monitoring with application context.

In some implementations, the disclosed technology can be implemented in the Application Performance Management Platform as a dynamic service that executes at scheduled intervals inside the runtime complementing existing agent capabilities in other ways.

—Application Intelligence Platform—

The embodiments herein relate to an application intelligence platform for application performance management. In one aspect, as discussed with respect to FIG. 3 below, performance within a networking environment may be monitored, specifically by monitoring applications and entities (e.g., transactions, tiers, nodes, and machines) in the networking environment using agents installed at individual machines at the entities. For example, each node can include one or more machines that perform part of the applications. The agents collect data associated with the applications of interest and associated nodes and machines where the applications are being operated. Examples of the collected data may include performance data (e.g., metrics, metadata, etc.) and topology data (e.g., indicating relationship information). In addition to collecting performance data, agents that embody the disclosed techniques for dynamic auditing of application components can collect data regarding vulnerabilities of the application components. The agent-collected data may then be provided to one or more servers or controllers to analyze the data.

Figure 3:
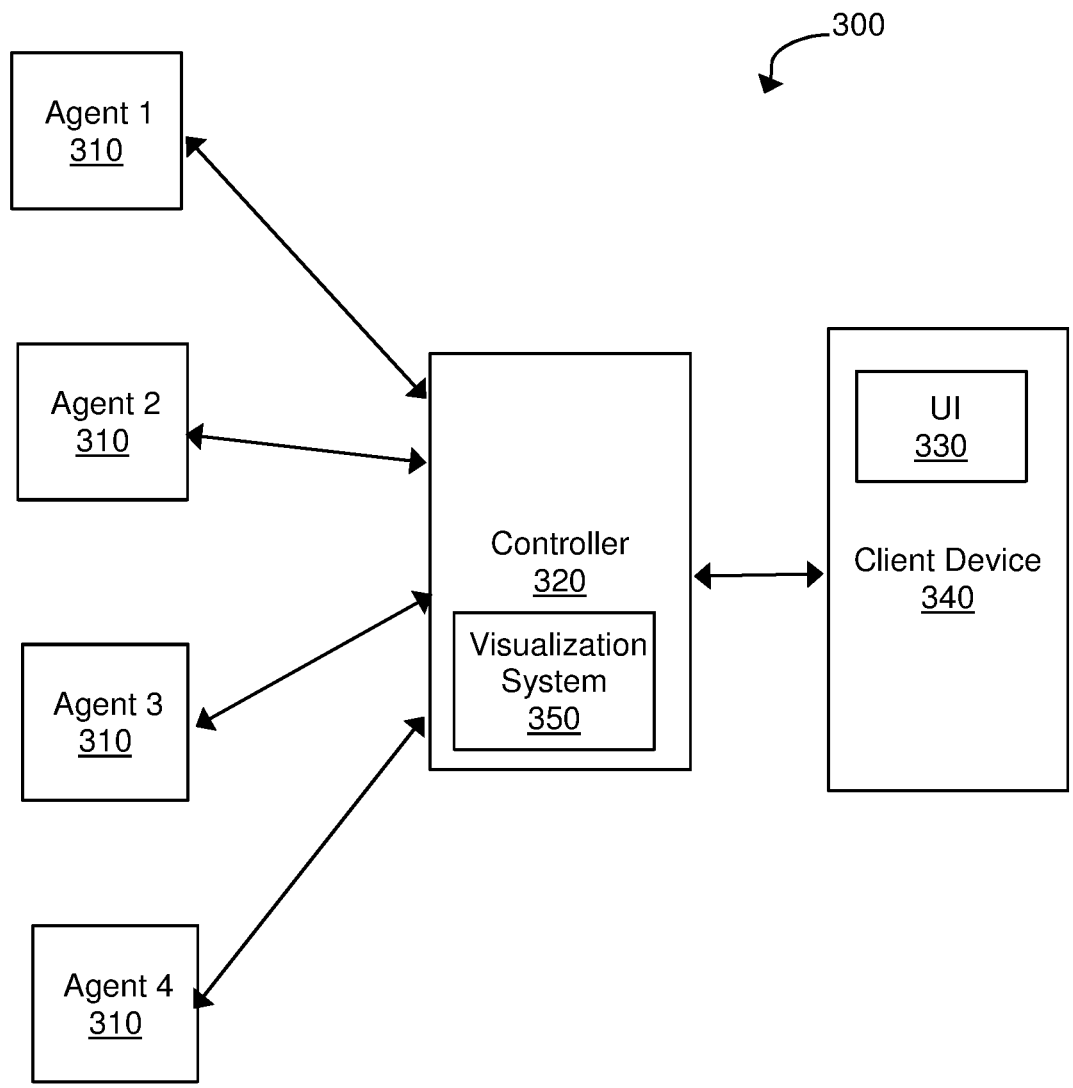
FIG. 3 illustrates an example application intelligence platform.

FIG. 3 is a block diagram of an example application intelligence platform 300 that can implement one or more aspects of the techniques herein. The application intelligence platform is a system that monitors and collects metrics of performance data and application component vulnerabilities for an application environment being monitored. At the simplest structure, the application intelligence platform includes one or more agents 310 and one or more servers/controllers 320. Note that while FIG. 3 shows four agents (e.g., Agent 1 through Agent 4) communicatively linked to a single controller, the total number of agents and controllers can vary based on a number of factors including the number of applications monitored, how distributed the application environment is, the level of monitoring desired, the level of user experience desired, and so on.

The controller 320 is the central processing and administration server for the application intelligence platform. The controller 320 serves a browser-based user interface (UI) 330 that is the primary interface for monitoring, analyzing, and troubleshooting the monitored environment. The controller 320 can control and manage monitoring of business transactions (described below) distributed over application servers. Specifically, the controller 320 can receive runtime data from agents 310 (and/or other coordinator devices), associate portions of business transaction data, communicate with agents to configure collection of runtime data, and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the application intelligence platform 300. In an illustrative on-premise (On-Prem) implementation, a controller instance 320 may be installed locally and self-administered.

The controllers 320 receive data from different agents 310 (e.g., Agents 1-4) deployed to monitor applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Database agents query the monitored databases in order to collect metrics and pass those metrics along for display in a metric browser (e.g., for database monitoring and analysis within databases pages of the controller's UI 330). Multiple database agents can report to the same controller. Additional database agents can be implemented as backup database agents to take over for the primary database agents during a failure or planned machine downtime. The additional database agents can run on the same machine as the primary agents or on different machines. A database agent can be deployed in each distinct network of the monitored environment. Multiple database agents can run under different user accounts on the same machine.

Standalone machine agents, on the other hand, may be standalone programs (e.g., standalone Java programs) that collect hardware-related performance statistics and application component vulnerabilities from the servers (or other suitable devices) in the monitored environment. The standalone machine agents can be deployed on machines that host application servers, database servers, messaging servers, Web servers, etc. A standalone machine agent has an extensible architecture (e.g., designed to accommodate changes).

End user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs. Notably, browser agents (e.g., agents 310) can include Reporters that report monitored data to the controller.

Browser agents and mobile agents are generally unlike other monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases.

A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Application Intelligence Monitoring: The disclosed technology can provide application intelligence data by monitoring an application environment that includes various services such as web applications served from an application server (e.g., Java virtual machine (JVM), Internet Information Services (IIS), Hypertext Preprocessor (PHP) Web server, etc.), databases or other data stores, and remote services such as message queues and caches. The services in the application environment can interact in various ways to provide a set of cohesive user interactions with the application, such as a set of user services applicable to end user customers.

Application Intelligence Modeling: Entities in the application environment (such as the JBoss service, MQSeries modules, and databases) and the services provided by the entities (such as a login transaction, service or product search, or purchase transaction) may be mapped to an application intelligence model. In the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

Business Transactions: A business transaction representation of the particular service provided by the monitored environment provides a view on performance data and application component vulnerabilities in the context of the various tiers that participate in processing a particular request. A business transaction, which may each be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to an HTTP payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)).

Performance and application component vulnerability monitoring can be oriented by business transaction to focus on the performance and application component vulnerability of the services in the application environment from the perspective of end users. Performance and application component vulnerability monitoring based on business transactions can provide information on whether a service is available (e.g., users can log in, check out, or view their data), response times for users, and the cause of problems when the problems occur.

A business application is the top-level container in the application intelligence model. A business application contains a set of related services and business transactions. In some implementations, a single business application may be needed to model the environment. In some implementations, the application intelligence model of the application environment can be divided into several business applications. Business applications can be organized differently based on the specifics of the application environment. One consideration is to organize the business applications in a way that reflects work teams in a particular organization, since role-based access controls in the Controller UI are oriented by business application.

A node in the application intelligence model corresponds to a monitored server or JVM in the application environment. A node is the smallest unit of the modeled environment. In general, a node corresponds to an individual application server, JVM, or Common Language Runtime (CLR) on which a monitoring Agent is installed. Each node identifies itself in the application intelligence model. The Agent installed at the node is configured to specify the name of the node, tier, and business application under which the Agent reports data to the Controller.

Business applications contain tiers, the unit in the application intelligence model that includes one or more nodes. Each node represents an instrumented service (such as a web application). While a node can be a distinct application in the application environment, in the application intelligence model, a node is a member of a tier, which, along with possibly many other tiers, make up the overall logical business application.

Tiers can be organized in the application intelligence model depending on a mental model of the monitored application environment. For example, identical nodes can be grouped into a single tier (such as a cluster of redundant servers). In some implementations, any set of nodes, identical or not, can be grouped for the purpose of treating certain performance metrics as a unit into a single tier.

The traffic in a business application flows among tiers and can be visualized in a flow map using lines among tiers. In addition, the lines indicating the traffic flows among tiers can be annotated with performance metrics. In the application intelligence model, there may not be any interaction among nodes within a single tier. Also, in some implementations, an application agent node cannot belong to more than one tier. Similarly, a machine agent cannot belong to more than one tier. However, more than one machine agent can be installed on a machine.

A backend is a component that participates in the processing of a business transaction instance. A backend is not instrumented by an agent. A backend may be a web server, database, message queue, or other type of service. The agent recognizes calls to these backend services from instrumented code (called exit calls). When a service is not instrumented and cannot continue the transaction context of the call, the agent determines that the service is a backend component. The agent picks up the transaction context at the response at the backend and continues to follow the context of the transaction from there.

Performance and application component vulnerability information is available for the backend call. For detailed transaction analysis for the leg of a transaction processed by the backend, the database, web service, or other application need to be instrumented.

The application intelligence platform uses both self-learned baselines and configurable thresholds to help identify application issues. A complex distributed application has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed application intelligence platform can perform anomaly detection based on dynamic baselines or thresholds.

The disclosed application intelligence platform automatically calculates dynamic baselines for the monitored metrics, defining what is "normal" for each metric based on actual usage. The application intelligence platform uses these baselines to identify subsequent metrics whose values fall out of this normal range. Static thresholds that are tedious to set up and, in rapidly changing application environments, error-prone, are no longer needed.

The disclosed application intelligence platform can use configurable thresholds to maintain service level agreements (SLAs) and ensure optimum performance levels for system by detecting slow, very slow, and stalled transactions. Configurable thresholds provide a flexible way to associate the right business context with a slow request to isolate the root cause.

In addition, health rules can be set up with conditions that use the dynamically generated baselines to trigger alerts or initiate other types of remedial actions when performance problems or application component vulnerability are occurring or detected or may be about to occur.

For example, dynamic baselines can be used to automatically establish what is considered normal behavior for a particular application. Policies and health rules can be used against baselines or other health indicators for a particular application to detect and troubleshoot problems before users are affected. Health rules can be used to define metric conditions to monitor, such as when the "average response time is four times slower than the baseline". The health rules can be created and modified based on the monitored application environment.

Examples of health rules for testing business transaction performance can include business transaction response time and business transaction error rate. For example, health rule that tests whether the business transaction response time is much higher than normal can define a critical condition as the combination of an average response time greater than the default baseline by 3 standard deviations and a load greater than 50 calls per minute. In some implementations, this health rule can define a warning condition as the combination of an average response time greater than the default baseline by 2 standard deviations and a load greater than 100 calls per minute. In some implementations, the health rule that tests whether the business transaction error rate is much higher than normal can define a critical condition as the combination of an error rate greater than the default baseline by 3 standard deviations and an error rate greater than 10 errors per minute and a load greater than 50 calls per minute. In some implementations, this health rule can define a warning condition as the combination of an error rate greater than the default baseline by 2 standard deviations and an error rate greater than 5 errors per minute and a load greater than 50 calls per minute. These are non-exhaustive and non-limiting examples of health rules and other health rules can be defined as desired by the user.

Policies can be configured to trigger actions when a health rule is violated or when any event occurs. Triggered actions can include notifications, diagnostic actions, auto-scaling capacity, running remediation scripts.

Most of the metrics relate to the overall performance of the application or business transaction (e.g., load, average response time, error rate, etc.) or of the application server infrastructure (e.g., percentage CPU busy, percentage of memory used, etc.). The Metric Browser in the controller UI can be used to view all of the metrics that the agents report to the controller.

In addition, special metrics called information points can be created to report on how a given business (as opposed to a given application) is performing. For example, the performance of the total revenue for a certain product or set of products can be monitored. Also, information points can be used to report on how a given code is performing, for example how many times a specific method is called and how long it is taking to execute. Moreover, extensions that use the machine agent can be created to report user defined custom metrics. These custom metrics are base-lined and reported in the controller, just like the built-in metrics.

All metrics can be accessed programmatically using a Representational State Transfer (REST) API that returns either the JavaScript Object Notation (JSON) or the eXtensible Markup Language (XML) format. Also, the REST API can be used to query and manipulate the application environment.

Snapshots provide a detailed picture of a given application at a certain point in time. Snapshots usually include call graphs that allow that enables drilling down to the line of code that may be causing performance problems. The most common snapshots are transaction snapshots.

Figure 4:
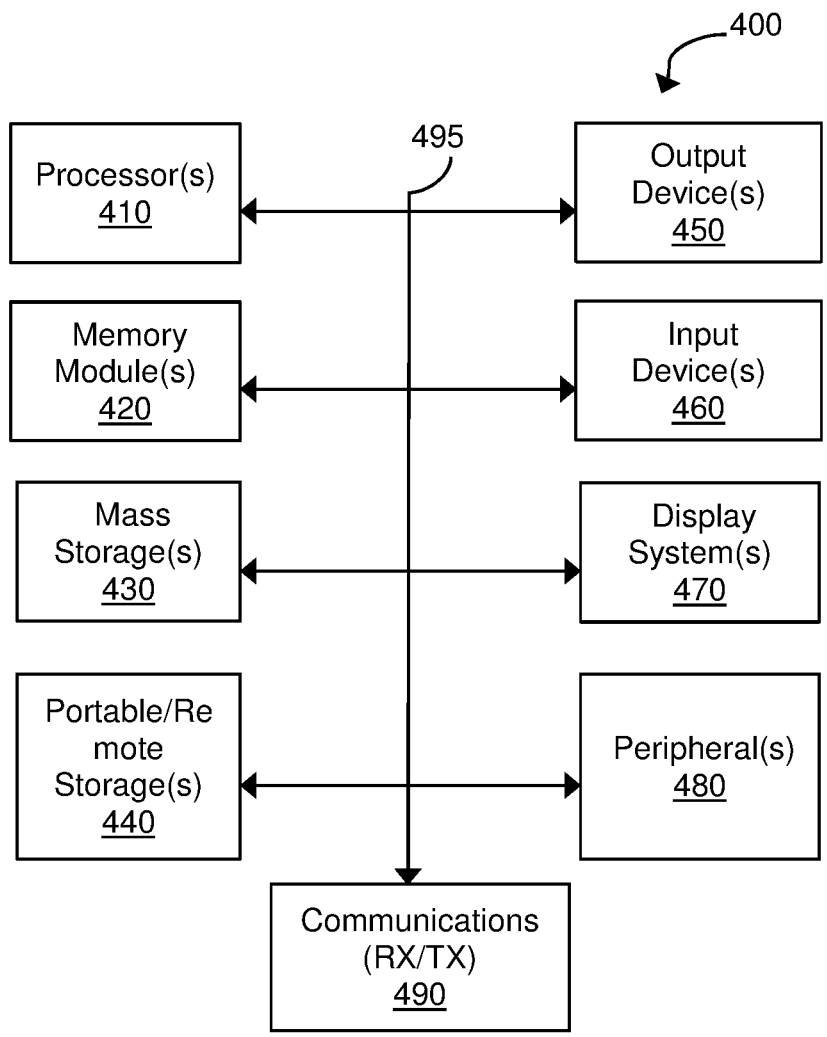
FIG. 4 illustrates an example computing system implementing the disclosed technology.

FIG. 4 is a block diagram of a computer system 400 for implementing the present technology, which is a specific implementation of agents (e.g., on application servers), controller (e.g., on same or separate servers), and client device of FIG. 3 above. Note that the specifically configured system 400 of FIG. 4 is not meant to be mutually exclusive, and the techniques herein may be performed by any suitably configured computing device.)

The computing system 400 of FIG. 4 includes one or more processors 410 and memory 420. Main memory 420 stores, in part, instructions and data for execution by processor 410. Main memory 410 can store the executable code when in operation. The system 400 of FIG. 4 further includes a mass storage device 430, portable storage medium drive(s) 440, output devices 450, user input devices 460, a graphics display 470, and peripheral devices 480.

The components shown in FIG. 4 are depicted as being connected via a single bus 490. However, the components may be connected through one or more data transport means. For example, processor unit 410 and main memory 420 may be connected via a local microprocessor bus, and the mass storage device 430, peripheral device(s) 480, portable or remote storage device 540, and display system 470 may be connected via one or more input/output (I/O) buses.

Mass storage device 430, which may be implemented with a magnetic disk drive or an optical disk drive, is a non-volatile storage device for storing data and instructions for use by processor unit 410. Mass storage device 430 can store the system software for implementing embodiments of the present invention for purposes of loading that software into main memory 420.

Portable storage device 440 operates in conjunction with a portable non-volatile storage medium, such as a compact disk, digital video disk, magnetic disk, flash storage, etc. to input and output data and code to and from the computer system 400 of FIG. 4. The system software for implementing embodiments of the present invention may be stored on such a portable medium and input to the computer system 400 via the portable storage device 440.

Input devices 460 provide a portion of a user interface. Input devices 460 may include an alpha-numeric keypad, such as a keyboard, for inputting alpha-numeric and other information, or a pointing device, such as a mouse, a trackball, stylus, or cursor direction keys. Additionally, the system 400 as shown in FIG. 4 includes output devices 450. Examples of suitable output devices include speakers, printers, network interfaces, and monitors.

Display system 470 may include a liquid crystal display (LCD) or other suitable display device. Display system 470 receives textual and graphical information and processes the information for output to the display device.

Peripherals 480 may include any type of computer support device to add additional functionality to the computer system. For example, peripheral device(s) 480 may include a modem or a router.

The components contained in the computer system 400 of FIG. 4 can include a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Apple OS, and other suitable operating systems, including mobile versions.

When implementing a mobile device such as smart phone or tablet computer, the computer system 400 of FIG. 4 may include one or more antennas, radios, and other circuitry for communicating over wireless signals, such as for example communication using Wi-Fi, cellular, or other wireless signals.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

What is claimed is:

1. A method for dynamic and continuous application component auditing in both pre and post production environment, the method including:
    automatically identifying, by an agent, all application components in an application;
    determining, by the agent, manifest information based on a Group Artifact Version (GAV) indicative of vendor, product, and version information for each of the identified application components;
    converting, by the agent, the determined manifest information to align with corresponding information in a vulnerability database using 1) a vendor configuration file which maps vendor names indicated by the GAV to vendor names included or expected to be included in the vulnerability database and 2) a product configuration file which maps product names indicated by the GAV to product names included or expected to be included in the vulnerability database;
    using a Web service to query the vulnerability database to search for a match between the converted manifest information and vulnerabilities in the vulnerability database; and
    responsive to the query, creating an audit report of the application components to be displayed via a user interface, wherein the audit report is indicative of whether any of the application components is vulnerable.

2. The method of claim 1, including: when a vulnerability in the vulnerability database matching the converted manifest information is found, the audit report includes a web-link pointing to an entry in the vulnerability database that describes the matched vulnerability.

3. The method of claim 2, including:
    creating a summary of the match.

4. The method of claim 2, including:
    generating an alert responsive to the match.

5. The method of claim 1, including:
    initiating a periodic repeating of the dynamic application component auditing to search for new vulnerabilities.

6. The method of claim 5, including:
    based on each subsequent check, generating additional notifications when new vulnerabilities are matched.

7. The method of claim 6, wherein the additional notifications include vulnerability health alerts.

8. The method of claim 6, including:
    generating a vulnerability score based on the periodic dynamic audits performed.

9. The method of claim 8, including:
    generating a recommendation of a preventative action.

10. The method of claim 8, including:
    automatically initiating a preventative action.

11. A system for dynamic application component auditing, the system including:
    a processor;
    memory; and
    one or more modules stored in the memory and executable by the processor to perform operations, including:

automatically identify all application components in an application;

determine manifest information based on a Group Artifact Version (GAV) indicative of vendor, product, and version information for each of the identified application components;

convert the determined manifest information to align with corresponding information in a vulnerability database using 1) a vendor configuration file which maps vendor names indicated by the GAV to vendor names included or expected to be included in the vulnerability database and 2) a product configuration file which maps product names indicated by the GAV to product names included or expected to be included in the vulnerability database;

use a Web service to query the vulnerability database to search for a match between the converted manifest information and vulnerabilities in the vulnerability database; and responsive to the query, create an audit report of the application components to be displayed via a user interface, wherein the audit report is indicative of whether any of the application components is vulnerable.

12. The system of claim 11, wherein, when a vulnerability in the vulnerability database matching the converted manifest information is found, the audit report includes a weblink pointing to an entry in the vulnerability database that describes the matched vulnerability.

13. The system of claim 12, wherein the one or more modules are executable to perform operations including:
generate an alert responsive to the match.

14. The system of claim 11, wherein the one or more modules are executable to perform operations including:
initiate a periodic repeat of the dynamic application component audits to search for new vulnerabilities.

15. The system of claim 14, wherein the one or more modules are executable to perform operations including:
based on each subsequent audit, generate additional notifications when new vulnerabilities are matched.

16. The system of claim 11, wherein the one or more modules are executable to perform operations including:
automatically initiate a preventative action.

17. A tangible, non-transitory, computer-readable medium storing program instructions that cause a computer to execute a process, the process including:

automatically identifying, by an agent, all application components in an application;

determining, by the agent, manifest information based on a Group Artifact Version (GAV) indicative of vendor, product, and version information for each of the identified application components;

converting, by the agent, the determined manifest information to align with corresponding information in a vulnerability database using 1) a vendor configuration file which maps vendor names indicated by the GAV to vendor names included or expected to be included in the vulnerability database and 2) a product configuration file which maps product names indicated by the GAV to product names included or expected to be included in the vulnerability database;

using a Web service to query the vulnerability database to search for a match between the converted manifest information and vulnerabilities in the vulnerability database; and responsive to the query, creating an audit report of the application components to be displayed via a user interface, wherein the audit report is indicative of whether any of the application components is vulnerable.

* * * * *